United States Patent [19]
Graf et al.

[11] Patent Number: 5,228,164
[45] Date of Patent: Jul. 20, 1993

[54] LAST FOR PREPARING CUSTOM FOOTWEAR

[75] Inventors: Peter M. Graf, San Francisco; Richard M. Stess, San Anselmo, both of Calif.; Dennis C. Bartizal, Woodbury, Minn.; Timothy C. Sandvig, Woodville, Wis.

[73] Assignee: Minnesota Mining and Manufacturing Company, St. Paul, Minn.

[21] Appl. No.: 565,565

[22] Filed: Aug. 10, 1990

Related U.S. Application Data

[63] Continuation of Ser. No. 371,283, Jun. 23, 1989, abandoned, which is a continuation of Ser. No. 137,878, Dec. 24, 1987, abandoned.

[51] Int. Cl.$^5$ .............................................. A43D 3/00
[52] U.S. Cl. .............................. 12/133 R; 12/146 L; 12/142 N
[58] Field of Search ............ 12/146 L, 142 N, 146 M, 12/133 R, 133 B, 128 R; 128/595, 90; 264/223; 36/88, 93

[56] References Cited

U.S. PATENT DOCUMENTS

| | | | |
|---|---|---|---|
| 1,647,639 | 11/1927 | Larson . | |
| 2,593,742 | 4/1952 | Friedman | 12/142 N |
| 2,602,193 | 7/1952 | Korkatti | 12/133 R |
| 2,952,082 | 9/1960 | Murray | 128/595 |
| 2,955,326 | 10/1960 | Murray | 12/142 N |
| 2,961,714 | 11/1960 | Murray | 12/146 L |
| 3,262,142 | 7/1966 | Keder | 12/146 L |
| 3,467,605 | 9/1969 | Abercrombie et al. | 12/133 R |
| 4,502,479 | 3/1985 | Garwood et al. | 128/90 |

FOREIGN PATENT DOCUMENTS 650623 7/1986 United Kingdom .

OTHER PUBLICATIONS

Pel Supply Co. Prosthetic Catalog, Price List, Sixth Edition vol. 1, Feb. 15, 1990, cover page and pp. 117 to 138.

Knit-Rite Product Reference Catalog No. 10, Jan., 1989, cover page, letter to customers, index page for Section 5 and pp. 525 to 535.

Two-Page instruction pamphlet entitled "Delta-Lite Conformable Casting Tape Instructions for Use" bearing a 1986 copyright notice.

Two-Page instruction pamphlet entitled "Indications and Directions for Use Plaster of Paris", undated but taken from a currently distributed product of Johnson & Johnson Products, Inc.

European Search Report, Application No. EP 88 31 2014, published on May 2, 1990.

Primary Examiner—Steven N. Meyers
Attorney, Agent, or Firm—Flehr, Hohbach, Test, Albritton & Herbert

[57] ABSTRACT

A kit for use in preparing a last, i.e., an anatomical model of the human foot for use in the contruction of custom footwear, as well as a method of preparing lasts, the lasts prepared by such a method, and the custom footwear constructed by the use of such lasts. The kit includes a hardenable, shell-forming fabric that can be conformed to the shape of the foot, hardened in its conformed shape, and removed from the foot in a manner that does not substantially destroy its conformed shape. The resultant shell, being sufficiently smooth and being of substantially the same size and shape as the foot, can be used directly as a positive model of the foot.

11 Claims, No Drawings

LAST FOR PREPARING CUSTOM FOOTWEAR

This is a continuation of application Ser. No. 07/371,283 filed Jun. 23, 1989, abandoned, which was a continuation of application Ser. No. 07/137,878 filed Dec. 24, 1987, abandoned.

TECHNICAL FIELD

This invention relates to the construction of custom footwear such as orthopedic footwear, bladders used to prepare custom-fitted ski boots, and the like. More particularly, this invention relates to the preparation of "lasts", i.e., models having substantially the same anatomical shape and size as a human foot, for use in custom footwear construction. In another aspect, this invention relates to methods and materials useful in making lasts and to lasts themselves.

BACKGROUND ART

Currently used methods for preparing lasts, i.e., anatomical models of the human foot for use in constructing custom footwear, generally involve first creating a plaster mold (i.e., negative impression) of the foot; then creating a plaster positive of the foot from the plaster negative; and lastly, having a skilled artisan hand-carve a wooden last using the plaster positive as a model. Alternatively, the artisan will use the plaster positive to modify a pre-formed last by carving material from, or adding material to, the pre-formed last in order to conform it to the plaster positive. See, e.g., J. E. Bishop, "If the Shoe Fits, It's Probably Been Mostly Luck Until Now", Wall Street Journal, Mar. 1, 1985, which describes the "primitive technology" currently used for making orthopedic shoes. As a result of this painstaking and cumbersome method, lasts that are used to make custom-fitted shoes generally cost at least hundreds of dollars each and can take weeks, if not months, to prepare.

The preparation of lasts by these artisans is estimated to represent fifty to seventy-five percent of the cost and effort involved in constructing custom footwear. Furthermore, the number of artisans skilled at such work is decreasing significantly, at a time when the elderly population is increasing the demand for custom footwear. As a result, many patients requiring custom orthopedic footwear do not have access to last designers, or simply cannot afford such footwear.

As discussed in the Bishop article, a promising approach for the future may be the use of computer-aided design and computer-aided manufacturing of custom footwear. See, e.g., "A Proposed Design for an Orthopedic Footwear CAD/CAM Delivery System", which is described as a "Report of Workshops to Define the Clinical and Engineering Criteria for a Computer-Aided Design and Manufacturing System for Orthopedic Footwear", prepared by Research Triangle Institute, D. J. Rouse, Project Director. As proposed, this approach would involve making a digital scan of a foot and using that information to carve a last on a computer-aided lathe. The affordability and feasibility of such an approach however remain to be proven. In light of the ever-increasing demand for orthopedic footwear, there exists a current and urgent need for a quick, inexpensive and effective method for preparing anatomically accurate lasts.

SUMMARY OF THE INVENTION

The present invention provides a kit for preparing a last, the kit comprising a hardenable, shell-forming fabric conformable to a human foot and removable therefrom as a shell after hardening, the conformed shell being sufficiently thin and having a sufficiently smooth exterior surface to permit the use of the shell as a last.

Preferably the fabric is hardened by the use of fabric hardening means selected from a group consisting of a hardenable material pre-coated on the fabric and a separate hardenable material to be applied to the fabric prior to application of the fabric to the foot.

The removed, hardened shell is thin and smooth enough to enable the outer surface thereof to be used directly as a positive model of the foot, i.e., the shell need not be used as a negative mold in order to prepare a positive model therefrom.

Preferably the shell is itself strong enough to enable it alone to be used as a last. Optionally, the kit of the present invention also includes means for filling the shell in order to provide it with additional strength for use as a last and/or to facilitate its handling, as well as rejoining means for rejoining the removed shell, in the event it was cut in order to facilitate its removal.

The present invention also provides a method of preparing such lasts, as well as the resultant lasts themselves.

According to the present invention, anatomically accurate lasts can be prepared at much less cost, with less effort and mess, and in a much shorter time than that required for currently used last systems, e.g., plaster molds followed by hand-carved wooden lasts.

DETAILED DESCRIPTION

The word "shell", as used herein shall refer to a hardened fabric. The word "conform" and inflected forms thereof, as used herein, shall refer to a hardenable, shell-forming fabric that is capable of being applied to a human foot and assume or take on the anatomical contours of the foot to the extent desired for custom footwear construction. The word "harden" and inflected forms thereof, as used herein, shall refer to a fabric capable of being sufficiently maintained, e.g., rigidified, in its conformed shape as a shell for use in preparing a last. The word "remove" and inflected forms thereof, as used herein, shall refer to the removal of a conformed shell from the foot in a manner that does not permanently destroy its conformed shape to a point where the shell is no longer useful for preparing a last. The word "filler", as used herein, shall refer to a material capable of filling a removed shell without undue distortion of the conformed shape of the shell, e.g., in order to confer additional strength on the shell for its use as a last and/or to facilitate handling of the last.

In a preferred embodiment of the kit of the present invention,
  a) the hardenable, shell-forming fabric is provided as a tubular member dimensioned to roll onto a human foot,
  b) the fabric is hardened by the use of a water-curable prepolymer resin that is impregnated into the fabric prior to packaging the fabric in a moisture impervious container in the kit, and
  c) the kit includes a filler capable of filling and providing additional strength to the removed shell.

A typical method of using such a preferred last kit involves applying the fabric to a foot, and conforming it to the shape of the foot. In the case of a water-curable resin, the resin can be activated by moisture either before applying the fabric to the foot or after it is in place on the foot. After conforming the fabric to the foot, and before it is completely hardened, it can be cut, e.g., nicked in one or more locations, preferably above the base of the toes, in order to facilitate later removal.

Once hardened in its conformed shape, the resultant shell is then carefully removed from the foot, e.g., by cutting the shell, beginning at the nick made earlier, along the top of the foot to the ankle, and continuing up the front of the leg to the edge of the fabric. Once cut, the shell can be gently spread apart and removed from the foot. This method of removal is preferred in that it is not likely to create undue pressures on the shell as it is removed, and is not likely to distort the shape of the shell, e.g., by cutting and rejoining, in areas where accurate shape is more critical, e.g., in the sole, heel and so on. The removed shell can then be rejoined, e.g., with the use of a tape, or an adhesive such as a hot melt adhesive, and the rejoined shell can be filled in order to confer on it sufficient additional strength for its use as a last and/or to facilitate its handling.

The materials useful in the present invention, e.g., fabrics, fabric hardening means, and filling means can each be prepared using a variety of materials. Fabrics useful for preparing shells of the present invention can be prepared using a variety of synthetic or natural, organic or inorganic fibers (including yarns, fiber bundles, filaments and strips) or combinations thereof. Suitable fibers exhibit a desired combination of such properties as strength, thinness, elasticity, and compatability with resin. Suitable fibers include, but are not limited to, those prepared from flat glass, texturized glass, lofted glass, carbon, boron, polyester, polyvinyl alcohol, polypropylene, and polyamide (e.g., "Kevlar TM", DuPont). Such fibers can be used alone or in suitable combination with each other or other fibers. Preferably, such fibers either have inherent elasticity or are used in combination with elastomeric fibers such as polyurethane elastomers (e.g., "Spandex TM" or "Lycra TM" brand fibers) or rubber elastomers in order to provide increased stretch and memory to the resultant fabric.

The extensibility of the fabric, i.e., the degree to which an uncoated fabric can be stretched, is an important consideration in the conformability of the fabric. Preferably fabrics suitable for use in this invention exhibit an extensibility of at least about 25%, and more preferably at least about 50%, in at least one direction, e.g., in the cross-web or machine directions. When prepared as a tubular member, such fabrics preferably exhibit an extensibility of at least about 100% in one direction, for example, in the radial (i.e., width) direction, and particularly preferred are those exhibiting an extensibility of at least about 200%. Proper extensibility of a tubular member ensures that the fabric can be stretched enough to be unrolled over even the widest portions of the foot, yet still conform to narrower portions thereof.

Preferred fibers are those that can be made into fabrics having sufficient strength at small thicknesses, as well as sufficient elasticity, i.e., memory, to enable a stretched fabric to tend towards its original dimensions and thereby conform to the foot. Examples of preferred fabrics are those made from lofted glass yarns in combination with elastomeric fibers laid-in in repeating courses. The glass yarn provides sufficient strength at even small thicknesses, whereas the in-laid elastomeric fibers provide sufficient stretch and memory to the fabric to allow it to be conformed once it is applied to the foot.

Fabrics made from the above-described fibers can be prepared by a variety of methods, e.g., as knit fabrics, including rib, circle and tubular knits, or as non-woven or woven fabrics. Preferably such fabrics are knit fabrics, and particularly those prepared using a weft knit technique, since such knits tend to exhibit an optimal degree of extensibility. Knit fabrics prepared by other techniques, e.g., warp-knit fabrics can be used as well, but generally do not exhibit as great a degree of extensibility.

Suitable fabrics exhibit an optimal combination of such properties as resin coatability and resin holding capacity, as well as flexibility, memory and conformability. Of at least equal importance, is that the fabrics be able to provide sufficient strength at small thicknesses, in order to be able to withstand the rigors of application to and removal from the foot. If to be used with filler, a fabric, when formed into a shell, must also be able to withstand the addition of a suitable filler without being distorted in shape or size to an extent where the shell is no longer useful as a last.

The words "strong" and "strength" and inflections thereof, as used herein with respect to a shell, refer to the ability of an unfilled or filled shell to be used as a last, e.g., to withstand the forces and pressures to be encountered in the course of custom footwear construction. Strength can be evaluated and compared, e.g., in the manner described in the examples below wherein the compressive strengths of shells are determined and compared.

A fabric used for preparing a last of the present invention should be of a thickness that does not preclude the use of the resultant last for its intended purpose. Generally the thickness should be no more than that which would add the thickness of an ordinary sock to the size and shape of the foot. In this way, the last can be used directly to represent the size and shape of the foot to be expected during use of the custom footwear, i.e., wearing one or more socks. Preferably such fabrics, prior to being coated with fabric hardening means, are on the order of 5 mm thick or less, and preferably on the order of 3 mm or less. Particularly preferred are fabrics on the order of 2 mm thick or less.

In this manner, the thickness of a final shell can be kept sufficiently small for its use as a last. Such a shell will frequently include one or more additional layers, such as thin, protective stockinettes, as used during the construction of orthopedic casts and described in greater detail below, that can be placed on the foot before application of the shell-forming fabric. Such stockinettes will frequently adhere to the fabric as it hardens and therefore become a part of the shell as it is removed. The use of a stockinette therefore slightly increases the shell's thickness, and therefore the shell's overall size with respect to the size of the foot. Furthermore, shells of the present invention may exhibit slightly varying thicknesses in different areas of the foot, depending on the extent to which the shell-forming fabrics are stretched during application and hardening. Preferably the shells of the present invention, including any such additional layers, and at every necessary portion thereof for use as a last, are of a sufficiently uniform thickness on the order of 6 mm thick or less, preferably on the order of 4 mm thick or less, and particularly preferred are shells on the order of 3 mm thick or less. Thickness can be measured by any appropriate means, e.g., with a caliper, ruler or the like.

Fabrics useful for preparing lasts of the present invention can be prepared in any form suitable for use as a shell, including in the form of tapes or sheets. Tapes can be used by wrapping the foot in a manner that minimizes gaps, overlaps and the like. Sheets can be used by wrapping the foot, e.g., with the use of bandage clips or an overwrap of ordinary stretch bandage, in a manner that minimizes folds and the like.

The word "smooth" and inflected forms thereof, as used herein, refers to an exterior surface of a shell that is, or can be made to be (e.g., by grinding or filling), sufficiently devoid of such imperfections as gaps, overlaps and folds to enable its use as a last.

Preferably the fabric is in the form of a tube, the tube preferably being closed at one end, in a manner analogous to that of a sock. This "sock-like" form facilitates the storage of the fabric, allowing it to be rolled onto itself in the form of a doughnut, and also facilitates the application and conformation of the fabric to the foot, allowing it to be unrolled onto the foot in a manner that minimizes gaps, overlaps, folds and the like.

Fabric hardening means useful in this invention include those means capable of hardening the fabric in its conformed shape, e.g., thermally-, photolytically-, and/or chemically-based means. Such means include, but are not limited to, resins that can be used to coat a fabric and can then be cured to harden the fabric. Preferred resins are curable to a crosslinked thermoset state, and are fluids, i.e., compositions having viscosities between about 5,000 cps and about 500,000 cps, and preferably between about 10,000 cps and about 100,000 cps. Preferably, the resins are nontoxic in the sense that they do not give off significant amounts of toxic vapors during curing that may be harmful to either the patient or the person applying the fabric. Similarly, the resins should not cause skin irritation either by chemical irritation or the generation of excessive heat during cure. Furthermore, the resins should be sufficiently reactive with an activating agent, e.g., water, to insure rapid hardening of the fabric once the fabric is applied and activated, but not so reactive that they do not allow sufficient working time, e.g., to properly conform the fabric.

Initially, the preferred shell forming fabric coated with resin is pliable and conformable. Then in a short time following completion of fabric application, and activation of the resin therein, it should harden, becoming rigid and strong enough to withstand removal from the foot, and eventually if desired, the addition of filler. Thus, the resin is preferably one that can undergo a change of state from a fluid-like condition to a solid condition in a matter of minutes.

The preferred resins are "water-curable", i.e., those cured by activation with water. Resins other than those that are water-curable can be used as well, although the use of water to begin the hardening of the fabric is generally both convenient and safe, and would offer a comfortable approach to podiatrists and other personnel expected to prepare the lasts of the present invention. Examples of suitable resins are disclosed in U.S. Pat. Nos. 3,908,644 and 4,131,114.

The preferred resins for use in the present invention are water-curable, isocyanate-functional prepolymers, i.e., prepolymers derived from an isocyanate and a reactive hydrogen compound or oligomer. Suitable prepolymers have sufficient isocyanate-functionality to cure upon exposure to water, e.g., moisture vapor, or preferably, liquid water. Suitable resins of this type are disclosed, for example, in U.S. Pat. Nos. 4,411,262, and 4,502,479, the disclosures of which are hereby incorporated by reference. Preferred resins are those having reduced tack, as described in U.S. Pat. No. 4,667,661, the disclosure of which is hereby incorporated by reference. The following disclosure relates primarily to a preferred embodiment of the invention, wherein water-curable isocyanate-functional prepolymers are employed as the fabric hardening means in a kit of the present invention.

It is preferred to coat the prepolymer onto the fabric as a polyisocyanate prepolymer formed by the reaction of an isocyanate and a polyol, as well as to use an isocyanate having low volatility such as diphenylmethane diisocyanate (MDI) rather than a more volatile material such as toluene diisocyanate (TDI). Aromatic polyisocyanates are generally preferred, in that they tend to cure faster and to a more rigid state than aliphatic polyisocyanates. Suitable isocyanates include 4,4'-diphenylmethane diisocyanate, 2,4'-diphenylmethane diisocyanate, and mixtures of these isomers, together with possible small quantities of 2,2'-diphenylmethane diisocyanate (typical of commercially available diphenylmethane diisocyanate), and aromatic polyisocyanates and their mixtures such as are derived from phosgenation of the condensation product of aniline and formaldehyde.

Suitable polyols for use in the prepolymer include polypropylene ether glycols (available from Union Carbide under the tradename Niax TM PPG and from BASF Wyandotte under the tradename Pluracol TM), polytetramethylene ether glycols (such as the Polymeg TM glycols available from the Quaker Oats Co.), polycaprolactone diols (such as the Niax TM "PCP" series of polyols from Union Carbide), and polyester polyols (hydroxyl-terminated polyesters obtained by the esterification of dicarboxylic acids and diols, such as the Rucoflex TM polyols available from the Ruco division of Hooker Chemicals Co.).

An example of a resin particularly preferred in preparing the lasts of the present invention is a resin prepared as described in the examples below from an isocyanate known as Isonate TM 143L available from the Upjohn Co. (a mixture containing about 73% of MDI) and a mixture of polypropylene oxide glycols. To prolong the shelf-life of such a resin, it is preferred to include from 0.01 to 1.0 percent by weight, based on the weight of the resin, of benzoyl chloride or another suitable stabilizer.

The "reactivity" of a preferred resin once it is activated by water, i.e., the rate at which it cures upon activation, can be controlled, e.g., by the use of catalysts such as those described herein. The reactivity should generally not be so great that: (1) a hard film quickly forms on the resin or fabric surface preventing further penetration of moisture into the bulk of the resin or fabric; or (2) the fabric becomes rigid and unworkable before its application and conformation to the foot is complete. Good results have been achieved using the catalyst 4-[2-[1-methyl-2-(4-morpholinyl)ethoxy]ethyl]-morpholine ("MEMPE") described in U.S. Pat. No. 4,705,840, the disclosure of which is incorporated by reference, at a concentration of about 0.05 to about 5 percent by weight, based on the weight of the resin.

Foaming of the resin should be minimized since it can tend to distort the shape of the fabric as it hardens. Foaming may occur when carbon dioxide is released as water reacts with isocyanate groups. A preferred method of minimizing foaming is to add a foam suppressor such as "DB-100" silicone fluid (Dow Corning) to the resin. It is especially preferred to use DB-100 at a concentration of about 0.05 to 1.0 percent by weight, based on the weight of the resin.

Shell forming fabrics can be coated with fabric hardening means such as resins according to a variety of suitable methods. The word "coat" and inflected forms thereof, as used herein, refers to any application of fabric hardening means, such as a resin, to a fabric in a manner that enables the coated fabric to be hardened. Kirk Othmer Encyclopedia of Polymer Science and Technology, "Fabrics, Coated", Vol. 6, pp 467-489 (1967), for instance, classifies coating processes for woven and nonwoven fibrous textiles as (1) impregnation (or saturation) processes, and (2) surface coating processes, such as wet-coating, dry-coating or lamination process. Resins can be coated either before packaging a kit of the present invention, e.g., by impregnation of the fabric with a resin, or can be included as a separate component of a kit of this invention and coated at the time of use, e.g., by dipping the fabric in resin, spraying it with resin, and so on.

The amount of resin that is coated, i.e., the "resin content", is conveniently expressed as the percentage of resin, based on weight, of the total coated fabric. A preferred resin content is that which will cure within the desired period of time after activation to provide a shell that is sufficiently hardened to be removed. Suitable resin contents will depend in part on both the type of resin and the type of fabric. For the preferred fabrics made from glass fibers, the preferred water-curable, isocyanate-functional resins are typically coated prior to packaging by a manual impregnation process, at a resin content of between about 40 and about 80 percent. Preferred resin contents for such resins and fabrics are between about 50 and about 70 percent. For other fabrics the optimal resin content can vary substantially from that employed with fabrics made from glass fibers. With some polyester fabrics, for instance, resin contents of on the order of as high as about 90 or even about 95% are typically achievable and suitable.

Removed shells are optionally filled by any means suitable to provide additional strength to the shells and/or to facilitate their handling. Unfilled shells can be used, e.g., by grasping or clamping the shells in ways that enable them to be held without undue distortion of their shape. Filled shells are preferred however, in that they are generally better able to withstand such rigors as: transport; the heating, tacking or gluing of shoe materials into or onto the lasts; the pressures and temperatures applied to the lasts during these procedures, and the grinding or filing away of portions of the finished lasts in order to alter their shape in a desired manner. Preferred fillers also, in turn, provide means for facilitating the handling of the resultant filled shells, e.g., by providing means to attach posts, handles, and the like, and to aid in clamping the finished lasts into work stations during the shoe-making process. The use of filler also provides additional gripping ability, e.g., for nails, tacks, staples and the like.

Suitable filling means include those materials that can occupy the desired interior volume of the shell in order to provide sufficient support to the opposite, i.e., exterior, surface without causing undue distortion of the shape of the shell, e.g., either by pressure and/or temperature effects of the filler on the shell.

Suitable filling means also exhibit a desired combination of such properties as conformation to irregular surfaces and volumes, safety, and ease of use during filling, set time (if applicable) after filling, and rigidity, weight, density, dimensional stability, and compressive, tensile and flexural strength when in use. Fillers can be of any form including, but not limited to, solids, semisolids, isotactic foams (i.e., forming open cells upon setting) or syntactic foams (i.e, having dispersed rigid hollow particles). Examples of suitable fillers include materials such as syntactic foams containing dispersed glass bubble and prepared from curable polyurethanes, polyesters, epoxies and the like. Other examples of suitable fillers include polyurethane isotactic foams that are able to be introduced into a confined area, e.g., as a liquid or semi-liquid, and therein "foam-in-place" so as to fill the area, ultimately hardening to form rigid foams.

Preferred fillers exhibit an optimal combination of such properties as weight, rigidity, strength, and set time, e.g, preferred are fillers having a set time less than about 60 minutes, and preferably less than about 30 minutes, and most preferably less than about 10 minutes.

Preferred fillers can be prepared as described, e.g., in "Foamed Plastics" Kirk-Othmer Encyclopedia of Chemical Technology, Vol. 11, pp 82-126 (1980), the disclosure of which is hereby incorporated by reference. Preferred isotactic polyurethane foams are commercially available and include foams supplied by the IPOS Company, Witco Co., and Stepan Co.

Preferably, isotactic foams are prepared having suitably small air bubble sizes, in order to assure that no portion of the shell abuts an unduly large area filled by air alone rather than air and foam. Using commercially available foams such as those described above, air bubble size can be controlled by incorporating an agent such as fumed silica in appropriate amounts. With the polymeric diisocyanate component ("Component A") of "Stepanfoam" (Stepan Co.) for instance, the incorporation of about 0.5 to about 5% fumed silica based on the weight of Component A, ("Cabosil M-5" Cabot Co.) serves to produce a foam having air bubbles that are suitably small. Preferably, the amount of fumed silica added is in the range of from about 0.5 to about 2% based on the weight of Component A.

Fillers can be dispensed into shells in any appropriate manner including, as solids, as liquids capable of becoming rigid once in the shells (e.g., expandable liquids), as sprays of foaming resins, as froths, and so on. Preferred polyurethane isotactic foams are ideally suited to be poured into shells immediately after the mixing of the foam components. A shell can be tilted on its toe and the liquid poured into the top of the shell so as to ensure proper filling. The liquid is able to fill the voids of the shell and therein foam in place, ultimately setting to a rigid but light-weight state. Foam that extends beyond the volume, i.e., out the top of the shell, can be easily cut away.

The materials, e.g., fabrics, fabric hardening means and filling means, useful in the present invention can be used with a variety of modifiers, additives, dyes, stabilizers, inhibitors, preservatives, plasticizers and other adjuvents in order to impart special desired properties thereto.

A preferred kit of the present invention can be used to prepare a last in the following manner.

The foot is first preferably covered with a thin non-stick material, e.g., a polyester stockinette, in order to protect the foot from resin and facilitate later removal of the resultant shell from the foot. Other materials can be used as well to protect the foot from the resin and/or facilitate removal of the shell, e.g., materials such as vaseline, cast cream and the like can be applied to the foot prior to application of the shell-forming fabric.

The shell-forming fabric, preferably in the form of a rolled tube of resin-coated fabric, is then applied to the foot, e.g., unrolled onto the foot. The foot can be configured and held into any desired position, e.g., it can be maintained in a neutral position in the manner set forth in U.S. Pat. No. 4,662,079. Similarly, the foot can have applied or attached to it devices, e.g., prostheses, wedges, and the like in order to create a last of the desired anatomical shape.

The foot, covered by the fabric, can then be dipped into, or sprayed with water in order to activate the resin and thereby harden the fabric. Preferably, however, the fabric is dipped into water, and the excess water is wrung out, immediately before being applied to the foot.

When sufficiently hardened, the resultant shell is removed from the foot in any suitable manner. Preferably, before it hardens, the fabric is pinched and nicked above the base of the toes, e.g., above the base of the third toe, to form an opening in the fabric into which scissors can later be inserted. Once hardened, the shell can then be cut in a line beginning at the nick made earlier, and along the top of the foot to the ankle and continuing up the front of the leg to the edge of the shell. The cut shell can then be gently spread apart, and slid off the foot. Alternative means for removing shells include, but are not limited to, the use of a strip, e.g., a metallic strip or wire, provided either under the fabric (i.e., on its interior surface), or as an integral part of the fabric. Such a strip can be used to cut the hardened shell by pulling it through or from the shell with sufficient force.

The removed shell is typically, and preferably, rejoined in order to secure it in its original conformed shape. The shell is preferably rejoined by rejoining means that do not substantially distort either its overall shape, or its shape at the point of rejoining. Suitable rejoining means include, but are not limited to, adhesives, such as hot melt adhesives, and tape adhesives.

The rejoined shell can then be filled with filler. When using the preferred polyurethane isotactic foam described above, the filler can be supplied in the form of a plurality of components, i.e., to be combined immediately before use, then poured into the shell, and there allowed to set.

The completed last, i.e., in this case the filled shell, can be used in a variety of ways. For instance, a dowel can be inserted into the filler after it is poured into the shell, e.g., before it sets, in order to provide securing and inverting means and facilitate its handling during the construction of orthopedic shoes. Alternatively, the last can be used as an impression material to represent the foot itself. Similarly, the last can be used to prepare custom-fit bladders for ski boots, for instance, by placing the last within a larger confined area, e.g., resembling a boot, and forming an insert by injecting a foam into the interstitial space.

A particular advantage of a last prepared using the preferred materials of the invention is that the worker using the last is able to insert tacks, staples and nails into the last in a retained relationship, e.g., to hold leather or other materials thereto, thereby facilitating the construction of custom footwear according to traditional techniques. Additionally, the completed lasts can withstand a variety of other traditional manipulations of lasts, e.g., they can be ground, as with a grinding wheel or file, or have material added, such as cork, in order to modify the shape thereof as desired.

The present invention will be further understood in view of the following examples which are merely illustrative and not meant to limit the scope of the invention.

EXAMPLE 1

Preparation of a Last Using a Hardenable, Shell-Forming Fabric

A tubular rib knit fabric was prepared as a double phase (cylinder and dial) rib knit of "ECDE 37 401 lofted fiberglass yarn" (having an actual length of 1421 m/kg (3470 yards/pound)) (Owens Corning), having a lay-in of elastomeric fibers ("Clearspan 1640" fiber available from Globe Manufacturing, Fall River, Mass.) every fourth course. This fabric exhibited an extensibility in excess of 200% in the width, i.e., course, direction, as determined by (1) measuring the fabric in a relaxed, unstretched, condition, (2) stretching the material by hand to a point where any additional stretching would cause the fabric to tear, and (3) measuring the fabric in that stretched condition.

A piece of this fabric measuring about 48 cm in length and having a diameter of about 9 cm was closed at one end (to become the toe end) with a machine-sewn overedge stitch, to form a rounded toe end.

Resin was prepared by blending the following chemicals in a glass vessel equipped with an impeller, addition funnel, nitrogen purge line and thermometer, in the manner described in Example 1 of U.S. Pat. No. 4,667,661, and the reaction was allowed to proceed as described therein.

| Chemical | Equivalent Weight | No. of Equivalents | Weight (g) |
| --- | --- | --- | --- |
| Methylene bis phenylisocyanate ("Isonate 143L", Upjohn Co.) | 145 | 15.83 | 2296.05 |
| Stabilizer (benzoyl chloride) | — | — | 2.41 |
| Antifoamer ("DB 100", Dow Chemical) | — | — | 6.45 |
| Antioxidant ("Ionol", Shell Chemical Co.) | — | — | 16.80 |
| Polyethylene oxide terminated polypropylene oxide ("Pluronic F-108", BASF) | 7250 | 0.02 | 140.00 |
| Polypropylene polyol gylcol (PPG 425", Union Carbide Corp.) | 215 | 3.63 | 780.32 |
| Polypropylene polyol glycol ("PPG 1025", Union Carbide Corp.) | 491 | 0.43 | 214.21 |
| Catalyst 4-[2-[1-methyl-2-(4-morpholinyl)ethoxy]-ethyl]morpholine ("MEMPE", U.S. Pat. No. 4,705,840) | — | — | 43.75 |

Resin prepared in the manner described above was applied to the fabric piece, in a dry environment maintained at less than 4% relative humidity, by manually spreading the resin onto the fabric with a wooden tongue depressor. The fabric was rolled and manually squeezed to uniformly distribute the resin throughout the piece. The final resin content was estimated to be about 60% by weight of the final coated fabric. The resultant shell-forming fabric was visually inspected to insure uniform coating, and then rolled into a doughnut-like shape and packaged in a moisture-proof foil pouch.

A filler was provided in the form of a two-part polyurethane isotactic foam, "Stepanfoam", which is commercially available from the Stepan Co., Northfield, Ill. This product includes a polymeric diisocyanate first component ("Stepanfoam Component A") and a fluorocarbon blown polyol resin second component ("Stepanfoam RI-9338"). In order to maintain suitably small bubbles in the resultant foam, Component A was mixed with 1.5 weight % of a high surface area fumed silica ("Cabosil M-5", Cabot Corp., Pittsburgh, Pa.). The filler is prepared immediately before use by mixing, in equal parts by weight, the first component (modified as described above) and the second component.

The resultant filler allows a working time of approximately 30 seconds, in order to allow it to be poured into a shell, after which time the mixture "foams" so as to fill the voids within the shell, and ultimately "sets", within about 5 minutes, in its final form.

The above-described shell-forming fabric and filler were provided in the form of a kit for use in preparing a last in the shape of a human foot. The kit could optionally be supplied with instructions for its use, and with other materials related to its use, such as a stockinette to protect the patient's foot, and tape or other adhesive to enable rejoining of the removed shell.

In order to use the above-described kit, the user followed the method described below:

1. The user applied a protective thin polyester knit stockinette to the patient's foot.
2. The user donned protective gloves.
3. The user opened the foil pouch containing the hardenable, shell-forming fabric and removed it from the ppouch.
4. The fabric was dipped into ambient temperature water and the excess water was squeezed out.
5. The user applied the fabric to the patient's foot by stretching it over the toe and unrolling the "doughnut" over the foot, around the heel and up over the ankle.
6. The fabric was then manipulated, smoothing out excess wrinkles, in order to conform it to the shape of the foot.
7. A set time of approximately 3-5 minutes was permitted, during which time the foot was maintained in a neutral position and the fabric was pinched and nicked above the base of the toes.
8. The fabric was cut along the top of the foot to the ankle and up the front of the leg to the edge of the fabric with a surgical scissors having a curved blade and the cut shell was manually spread apart and slid off the foot without undue permanent distortion of its overall shape.
9. The cut seam was rejoined using a hot melt adhesive ("Jet Melt #3792", 3M), by forming a bead of adhesive down the seam and allowing the bead to cool.
10. The hardened, removed, and rejoined shell was filled with the supplied filler, the components of which were mixed as described above. Filling was accomplished by tipping the shell such that the toe portion pointed down and the heel was raised. The filler was poured into the top opening of the shell. Excess filler was allowed to overflow the shell, but was trimmed off once the foam was set. The shape and dimensions of the shell retained the desired original shape of the shell as hardened on the foot.
11. The resultant finished last was sent to a custom orthopedic shoe manufacturer for use in constructing an orthopedic shoe.

The shoe manufacturer was able to modify the last as needed by grinding or cutting, and use the last as a model of the foot for constructing a custom-fitting orthopedic shoe. The last served as an excellent model of the foot, was durable, and functioned very well in providing a good fitting orthopedic shoe.

EXAMPLE 2

Evaluation of Various Fabrics as Shell-forming Fabrics

The following fabrics were manually coated with resin prepared in the manner described in EXAMPLE 1. The fabrics were fully coated with resin, i.e., to a resin content that appeared to be the most resin each fabric would reasonably hold during storage and in use. The resin of each fabric was activated by water in the manner described in EXAMPLE 1 and a 7.6 cm (3 inch) long piece of each fabric was applied to a 5.08 cm (2 inch) (outer diameter) mandrel (prepared from galvanized pipe) that had been previously covered with one layer of a standard (uncoated) polyester stockinette. The fabric was then conformed to the shape of the mandrel by smoothing the fabric by hand, using rubber gloves. After the fabric was hardened to the point where it could be removed from the mandrel without destroying its conformation, it was removed by sliding it off the end of the mandrel and allowed to completely harden for one day.

FABRICS

1. Standard polyester rib-knit stockinette (Balfour Inc., Rockwood, Tenn.), resin content 65%, approximate thickness 1 mm.
2. Same as fabric no. 1, applying and conforming two resin-coated stockinettes, one after the other, i.e., in order to form a double layer, approximate thickness 2 mm.
3. Tubular polyester rib-knit prepared with 380 denier polyester yarn, using two ends per feed on a circular knitter, with lay-in of elastomeric "Clear Span" fiber every fourth course, resin content 74%, approximate thickness 2 mm.
4. Tubular glass knit prepared as described in EXAMPLE 1, resin content 65%, approximate thickness 2½ mm.

The removed, hardened shells were each placed in a compression tester ("Instron", Model 1122, Universal Testing Equip. Co., Canton, Mass.) and the force necessary to crush each shell radially along its entire length, i.e., its resistance to crushing, was determined using a 454.5 kg (1000 pound) load cell and a cross-head speed of 5.08 cm/min. (2 in/min.). The results are set forth below in TABLE I in which the "Peak" values represent the total force withstood by the shell before breaking, and the "Compressive strength" values represent the peak force divided by the length of the shell.

TABLE I

| Fabric | Peak (kg) | Compressive strength (kg/m) |
|---|---|---|
| Polyester stockinette | 0.1 | 1.3 |
| Polyester stockinette (double layer) | 1.9 | 23.9 |
| Polyester knit | 8.7 | 112.3 |
| Glass knit | 14.8 | 189.5 |

The results in TABLE I show that both the polyester knit and the glass knit provided shells that were substantially more resistant to crushing than the resin-coated stockinette, even used as a double layer. Moreover, it was apparent that neither the single or double layers of stockinette would have been rigid enough to withstand the twisting, spreading type of motion that would have been necessary to remove them from a larger, irregularly-shaped object such as a foot.

The greater resin-holding capacity of the polyester knit compared to the stockinette (also made of polyester), as shown by its higher resin content, likely contributed to the greater resistance to crushing of the polyester knit. The improved properties of the glass knit, even compared to the polyester knit, appears to reflect the added strength of glass fibers as compared to polyester fibers. Preferred unfilled shells of this invention, when evaluated in this manner, exhibit peak force of at least about 5 kg, and more preferably at least about 10 kg, and compressive strength of at least about 50 kg/m, and more preferably at least about 100 kg/m.

EXAMPLE 3

Compressive Strengths of Filled Shells

Long pieces (about 30.5 cm) of polyester knit and glass knit were made into shells as described in EXAMPLE 2 and were filled with two-part isotactic polyurethane foam filler in the manner described in EXAMPLE 1. They were then cut into 7.62 cm (3 inch) pieces and the resistance to crushing of each was tested in the manner described in EXAMPLE 2. The filled shell prepared from a polyester knit exhibited an average peak value of 100 kg, and an average strength value of 1310 kg/m (n=5). The filled shell prepared from a glass knit exhibited average values of 74 kg and 1160 kg/m, respectively (n=5). This EXAMPLE demonstrates that, whereas the unfilled glass knit demonstrated greater values than the unfilled polyester knit, both values are greatly improved when the knits are filled in the manner described. When evaluated in this manner preferred filled shells of this invention exhibit peak force of at least about 50 kg, and more preferably at least about 100 kg, and compressive strength of at least about 1000 kg/m, and more preferably at least about 1300 kg/m.

EXAMPLE 4

Preparation and Use of Syntactic Foam as Filler

Polyester knit and glass knit fabrics were prepared in the manner described in EXAMPLE 2, and were conformed and hardened in the shape of a stockinette-covered artificial foot form. They were then removed from the foot form by cutting, and rejoined by wrapping two turns of 5.08 cm (2 in.) wide vinyl tape around the outside of the resultant shells.

A syntactic foam was prepared by combining polyol ("LHT-240", Union Carbide) and isocyanate ("Isonate 143L", Upjohn Co.) at an NCO to OH ratio of 1.05 to 1. To this mixture was added 0.1% by weight stannous octoate as catalyst ("MT-T9", M & T Chemicals, Inc., Rahway, N.J.), and a volume of glass bubbles (Scotchlite TM brand, type "C15-250", 3M) equal to the volume of the mixture. The glass bubbles were quickly stirred into the mixture and the resulting filler was immediately used to fill the shells.

After a ten minute period to allow the filler to cure, the filled shells were examined. Neither shell was visibly distorted in shape by the syntactic foam as it cured, and the vinyl tape was able to maintain the rejoined shells in their desired shapes.

Though heavier than a comparable shell filled with the isotactic foam described in EXAMPLE 3 (e.g., isotactic foam-filled glass knit=154 g, syntactic foam-filled glass knit=721 g), the syntactic foam-filled shells were extremely tough, e.g., they could withstand severe pounding on a solid surface, and did an excellent job reinforcing the shells. Such syntactic foam-filled shells functioned as well as a wooden last, e.g., they could be ground, and showed very good nail- and tack-holding ability.

What is claimed is:

1. A kit for preparing a last comprising:
   a unitary, tubular, shell-forming fabric having sufficient extensibility and memory to be applied to a human foot and there tend towards its original dimensions so as to conform to said foot and be removable therefrom as a shell after hardening, the conformed shell being sufficiently thin and having a sufficiently smooth exterior to permit the use of said shell as a last; and
   fabric hardening means in the form of a curable resin pre-coated on said fabric.

2. A kit according to claim 1 wherein,
   said fabric is provided as a tubular member dimensioned to roll onto said foot, and
   said fabric hardening means is provided as a curable resin pre-coated on said tubular member.

3. A kit according to claim 2 wherein said tubular member exhibits extensibility of over 100 percent in at least on direction.

4. A kit according to claim 2 wherein,
   said fabric is provided as a sock-like tubular member, and
   said resin comprises a water-curable, isocyanate-functional prepolymer.

5. A kit according to claim 4 wherein said resin further comprises catalyst.

6. A kit according to claim 1 wherein said fabric comprises lofted glass yarn with elastomeric fibers laid-in repeating courses.

7. A kit according to claim 1 wherein the thickness of said fabric is on the order of 5 mm or less.

8. A kit according to claim 1 further comprising means for fitting said shell after removal from said foot.

9. A kit according to claim 8 wherein said filling means comprise a foam selected from a group consisting of isotactic foams and syntactic foams.

10. A kit according to claim 9 wherein said filling means comprise a foam selected from a group consisting of two-part polyurethane isotactic foams and glass bubble-filled foams.

11. A kit for preparing a last comprising:
    a unitary, tubular, shell-forming fabric having sufficient extensibility and memory to be applied to a human foot and there tend towards its original dimensions so as to conform to said foot and be removable therefrom as a shell after hardening, said fabric being sufficiently thin and having a sufficiently smooth exterior to permit the use of said fabric to form a last; and
    fabric hardening means in the form of a separate curable resin to be applied to said fabric prior to application of said fabric to said foot.

* * * * *

UNITED STATES PATENT AND TRADEMARK OFFICE
CERTIFICATE OF CORRECTION

PATENT NO. : 5,228,164
DATED     : July 20, 1993
INVENTOR(S) : Peter M. Graf et al.

It is certified that error appears in the above-indentified patent and that said Letters Patent is hereby corrected as shown below:

Col. 14, line 33, claim 3, line 3, "on" should be --one--.

Col. 14, line 45, claim 7, line 2, delete "on the order of 5 mm or less" and insert therefor --not greater than about 5 millimeters--.

Col. 14, line 47, claim 8, line 2, "fitting" should be --filling--.

Signed and Sealed this

Twenty-ninth Day of March, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,228,164

DATED : July 20, 1993

INVENTOR(S) : Graf et al.

It is certified that error appears in the above-indentified patent and that said Letters Patent is hereby corrected as shown below:

On the title page: Item

[73], after Assignee:, delete "Minnesota Mining and Manufacturing Company, St. Paul, Minn.", and insert therefor -- Minnesosta Mining and Manufacturing Company, St. Paul, Minnesota; and ( Part Interest) --.

Signed and Sealed this

Thirteenth Day of February, 1996

Attest:

BRUCE LEHMAN

Attesting Officer

Commissioner of Patents and Trademarks